United States Patent
Davidson et al.

(10) Patent No.: US 12,492,107 B2
(45) Date of Patent: Dec. 9, 2025

(54) CONTINUAL PROACTIVE LEARNING FOR AUTONOMOUS ROBOT AGENTS

(71) Applicant: Third Wave Automation, Inc., Union City, CA (US)

(72) Inventors: James Davidson, Alameda, CA (US); Julian Mason, Redwood City, CA (US); Arshan Poursohi, Berkeley, CA (US)

(73) Assignee: Third Wave Automation, Inc., Union City, CA (US)

( * ) Notice: Subject to any disclaimer, the term of this patent is extended or adjusted under 35 U.S.C. 154(b) by 452 days.

(21) Appl. No.: 17/635,976

(22) PCT Filed: Aug. 16, 2019

(86) PCT No.: PCT/US2019/046786
§ 371 (c)(1),
(2) Date: Aug. 9, 2022

(87) PCT Pub. No.: WO2021/034303
PCT Pub. Date: Feb. 25, 2021

(65) Prior Publication Data
US 2022/0289537 A1    Sep. 15, 2022

(51) Int. Cl.
*B66F 9/06* (2006.01)
*B66F 9/075* (2006.01)
*G05D 1/00* (2024.01)

(52) U.S. Cl.
CPC .......... *B66F 9/063* (2013.01); *B66F 9/07581* (2013.01); *G05D 1/0061* (2013.01); *G05D 1/0088* (2013.01); *G05D 1/0287* (2013.01)

(58) Field of Classification Search
CPC ... B66F 9/063; B66F 9/07581; G05D 1/0061; G05D 1/0088; G05D 1/0287;
(Continued)

(56) References Cited

U.S. PATENT DOCUMENTS 5,938,710 A * 8/1999 Lanza .................... B66F 9/063
701/28
8,639,644 B1 * 1/2014 Hickman ............. G05B 19/042
706/14
(Continued)

FOREIGN PATENT DOCUMENTS

WO    WO-2017197170 A1 *  11/2017
WO       2018146687 A1     8/2018
WO    WO-2018183045 A1 *  10/2018 ............ B25J 13/006

OTHER PUBLICATIONS

International Search Report from PCT/US2019/046786, mail date Jun. 23, 2020 1-15 pages.
(Continued)

Primary Examiner — Hunter B Lonsberry
Assistant Examiner — Henry R Hinton
(74) Attorney, Agent, or Firm — Straub & Straub; Michael P. Straub; Stephen T. Straub

(57) ABSTRACT

A robot agent (102) includes an electro-mechanical subsystem (202), a sensor subsystem (204) having one or more sensors, and a computer hardware subsystem (206) to execute one or more sets of executable instructions (212, 214, 216, 218, 220). The one or more sets of executable instructions manipulate the robot agent to predict an action to be implemented by the robot agent in performing a task (112) and predict whether the robot agent will fail in performing the action. The one or more sets of executable instructions further manipulate the robot agent to, responsive to predicting the robot agent will fail in performing the action, obtain guidance input (116) for the first action from at least one guidance source, the guidance input representing guidance for performing the action by the robot agent, and manipulate the electro-mechanical subsystem to perform the action using the guidance input.

20 Claims, 4 Drawing Sheets

(58) Field of Classification Search
CPC . G05B 2219/39212; G05B 2219/40153; B25J 9/1689
See application file for complete search history.

(56) References Cited

U.S. PATENT DOCUMENTS

| | | | |
|---|---|---|---|
| 10,360,531 B1* | 7/2019 | Stallman | G06Q 10/087 |
| 10,564,638 B1* | 2/2020 | Lockwood | G05D 1/0027 |
| 2014/0163730 A1* | 6/2014 | Mian | B25J 9/1689 |
| | | | 700/248 |
| 2017/0192423 A1* | 7/2017 | Rust | G05D 1/0212 |
| 2018/0009643 A1* | 1/2018 | Hoffman | B66F 9/24 |
| 2018/0250831 A1 | 9/2018 | Hashimoto et al. | |
| 2019/0206400 A1* | 7/2019 | Cui | B25J 9/1697 |
| 2019/0339693 A1* | 11/2019 | Menon | G05D 1/81 |
| 2019/0359424 A1* | 11/2019 | Avraham | G06Q 10/08 |
| 2020/0192351 A1* | 6/2020 | Rastoll | G05D 1/0038 |
| 2022/0331962 A1* | 10/2022 | Pirk | B25J 9/161 |

OTHER PUBLICATIONS

Written Opinion of the International Searching Authority from PCT/US2019/046786, mail date Jun. 23, 2020 1-15 pages.

* cited by examiner

CONTINUAL PROACTIVE LEARNING FOR AUTONOMOUS ROBOT AGENTS

BACKGROUND

Robot agents have significant potential for replacing humans in performing tedious, repetitive, or dangerous physical tasks. Artificial intelligence (AI) techniques, which typically provide the basis for the automation of such agents, rely on learning to improve the performance of the robot agent. Feedback typically is the primary driver of learning for robot agents, whereby the feedback can take the form of information-rich input, such as through the use of learning demonstrations, or the form of information-sparse input, such as through reinforcement learning techniques. Either way, the learned model employed by the robot agent develops gradually, providing improved performance of various tasks as the robot agent learns from its performance of past tasks. While conventional continuous learning techniques enable a robot agent to develop more robust task performance over time, in many implementations a failure by a robot agent to adequately perform a task may have significant consequences, including causing harm or death to humans or the destruction of property. In such implementations, it typically is unacceptable to allow a robot agent to learn through feedback in the form of failed task performances due to the unacceptable risk posed by failed task performance, and thus techniques are needed to facilitate continual learning by a robot agent to improve its performance of varied tasks while reducing or eliminating the risk of failure to adequately perform tasks.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
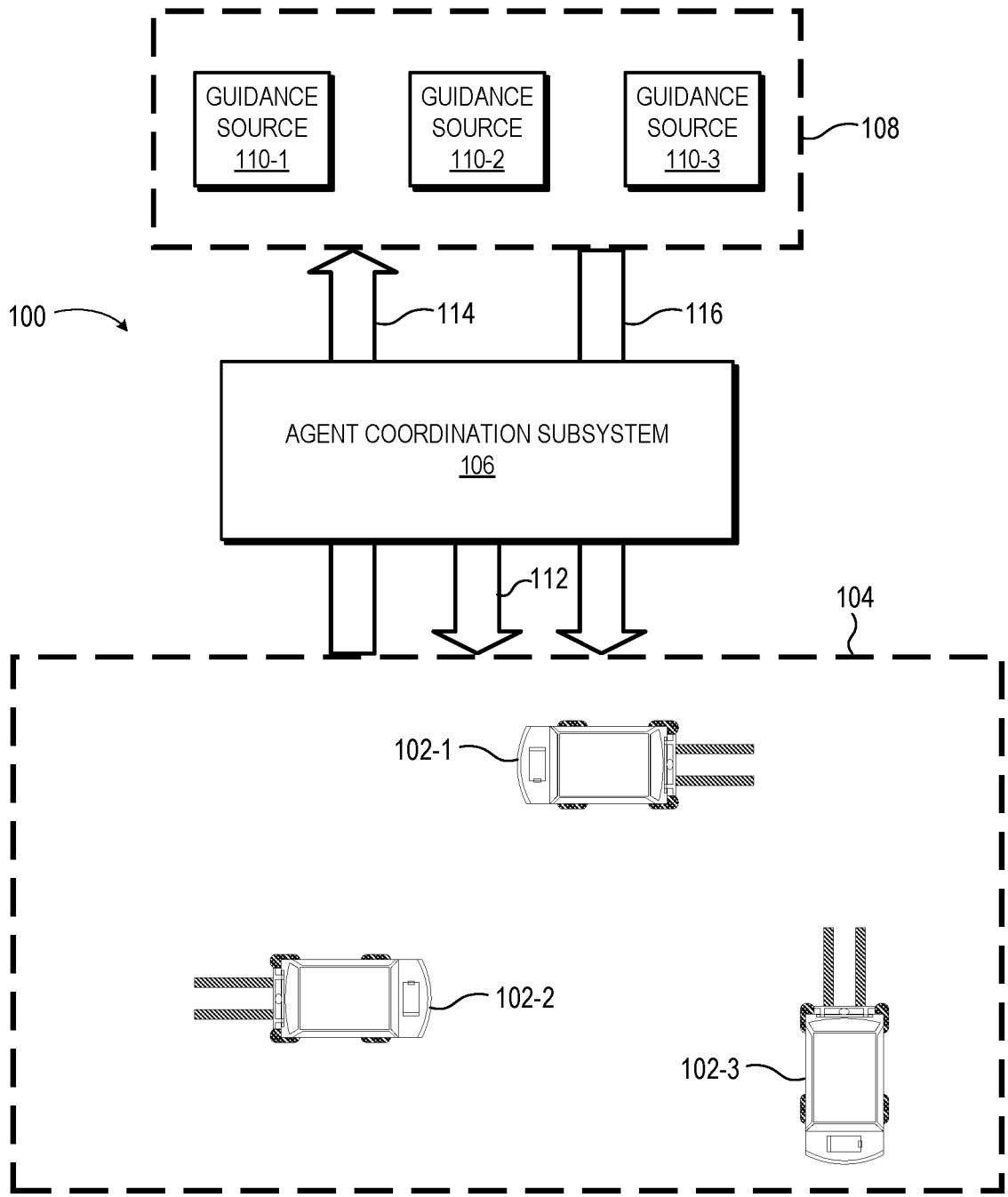
FIG. 1 is a block diagram of an autonomous robotic system employing a proactive continual learning technique in accordance with some embodiments.

In systems where task performance failure is of low consequence, an AI-enabled agent (or simply, an "AI agent") can learn to improve its task performance from both tasks it succeeds at and tasks it fails at. However, in environments where failed task performance is of higher consequence, AI agents typically employ a conventional continual learning technique that mitigates the risk of task performance failure by requiring that the AI agent seek guidance from a teacher for each and every step, or action, to be performed by the AI agent in furtherance of an assigned task, with the intention of avoiding task performance failure by having an expert guide every action in performance of a given task. This expert providing guidance may be a human operator or another AI system. When the expert is a human operator, conventional learning approaches typically devolve into little more than a teleoperation (or remote operation) approach in which human intervention is needed at every step, and thus undermining the "autonomous" aspects of the system as well as potentially overloading the ability of the human expert to provide guidance in a timely manner. In a similar manner, when the expert is another AI system, the need to provide guidance to the AI agent for each and every action performed by the AI agent may overwhelm the resources of the other AI system performing as the expert, particularly when the expert AI system is providing guidance to a number of AI agents concurrently.

In contrast with the resource-intensive and autonomy-undermining approach of conventional continual learning systems, the systems and techniques described herein employ a proactive continual learning process in which a robot agent predicts the actions it will need to take in furtherance of an assigned task, and for each action, predicting whether it is likely to fail in performing the action based on any of a variety of signals and in accordance with one or more policies. When the robot agent predicts that it will be able to perform the action without failing, the robot agent then proceeds in an unguided mode in which the robot agent performs that action at the appropriate time without seeking any guidance input from a guidance source (that is, an expert or a teacher). Conversely, when the robot agent predicts that it will fail to perform the action, the robot agent enters a guided mode in which the robot agent seeks guidance input on performing the action from one or more guidance sources. The robot agent then selects from the received guidance input, integrates the selected guidance input into a guided solution for performing the action, and proceeds to perform the action as informed by the guided solution.

Further, the prediction (or forecast) of sequence of actions, as well as the prediction of whether performance of an action will fail, in some embodiments, is conducted using a learned model. One or both of the guidance input received from the one or more solicited guidance sources and the results of performing the action with the solution determined from the guidance are incorporated into the learned model to facilitate continual, or lifelong learning, by the robot agent so that similar actions may be subsequently successfully performed by the robot agent without seeking guidance and based on the feedback represented by the guidance input and the results of the performed action.

For purposes of the disclosure contained herein, a robot agent is a compute-enabled machine configured to operate at least semi-autonomously to perform a sequence of actions in furtherance of a task using one or more electro-mechanical components of the machine. An action, in the context of an action performed or to be performed by a robot agent, thus includes at least one movement of at least a physical component of the robot agent in physical space. For ease of reference, the following description provides examples in the context of autonomous warehouse robots as robot agents, and more particularly, autonomous pallet forklifts as robot agents and a warehouse as their operating environment. However, such examples are for illustrative purposes only. The techniques described herein may be employed for any of a variety of types of robot agents, such as autonomous automobiles or other human transportation vehicles, autonomous industrial construction equipment, autonomous outdoor construction equipment, drones and other autonomous aerial equipment, fixed-location robotic arms for pick-and-place or manufacturing, and the like.

FIG. 1 illustrates an autonomous robotic system 100 employing a proactive continual learning technique in accordance with some embodiments. The system 100 includes a set of one or more robot agents, such as the three illustrated robot agents 102-1, 102-2, and 102-3 (collectively, robot agents 102), operating within an operating environment 104. As one illustrative example, the operating environment 104 may comprise a warehouse and the robot agents 102 may represent autonomous or semi-autonomous forklifts configured to transport and place pallets and other large objects within the warehouse. The system 100 further includes an agent coordination subsystem 106 and a set 108 of one or more guidance sources, such as the three illustrated guidance sources 110-1, 110-2, and 110-3 (collectively, guidance sources 110). The agent coordination subsystem 106 is a computing system configured to coordinate the operations of the robot agents 102, including assignment of tasks to the different robot agents 102, as well as communication and other coordination of guidance requests from the robot agents 102 to the guidance sources 110 and resulting guidance input from the guidance sources 110 to the robot agents 102. The performance of the various operations of the agent coordination subsystem 106 may be autonomous, directed by a human operator, or a combination thereof. The guidance sources 110 operate as "experts" or "teachers" for the robot agents 102, and may be implemented as human operators providing feedback or other guidance through a computer interface, other robot agents, an expert system or other optimized AI system, or combinations thereof.

As a general operational overview, the agent coordination subsystem 106 is configured to identify or define a set of tasks in furtherance of one or more goals. The agent coordination subsystem 106 monitors various parameters for the operating environment 104 and the robot agents 102 and assigns tasks among the robot agents 102-1, 102-2, and 102-3 accordingly. In response to receiving an assigned task from the agent coordination subsystem 106 (task communication 112), a robot agent 102 uses a learned model to predict, or forecast, a sequence of actions to be implemented by the robot agent 102 to perform the assigned task. Each action represents an at least partially mechanical operation to be performed by the robot agent 102 within the operational environment 104. To illustrate using the warehouse and autonomous forklift example, an assigned task may be a task to move a particular pallet of good from a pallet rack in the warehouse to the trailer of a semi-tractor parked in a specified loading bay of the warehouse. In this example, the sequence of actions would include actions to route the forklift from its current location to a suitable location facing the identified pallet rack, actions to identify the pallet on the pallet rack, actions to pick the identified pallet, actions to route the forklift with the picked pallet through the warehouse to the trailer, actions to place the pallet in a suitable location in the trailer, and so forth.

For each of at least a subset of the predicted actions for a task, the robot agent 102 uses the learned model and various signals to predict whether the robot agent will fail to perform the action in accordance with one or more policies. Such signals may include an indication of the quality of the action (e.g., a qualitative or quantitative evaluation of one or both the utility of the action and the risks of the action)(block 507), a qualitative or quantitative evaluation of the probability of failure in performing the action (block 508), and the like. If the resulting failure predictor indicates that the robot agent 102 is predicted to succeed at performing the task, then the robot agent 102 operates in an unguided mode to perform the task without seeking guidance from any of the guidance sources 110. Conversely, if the resulting failure predictor indicates that the robot agent 102 is predicted to fail in performing the task, then the robot agent 102 operates in a guided mode in which the robot agent 102 seeks guidance input from one or more of the guidance sources 110 by transmitting a guidance request 114 to the agent coordination subsystem 106. The agent coordination subsystem 106 routes the guidance request 114 to one or more of the guidance sources 110. In response to the guidance request 114, a receiving guidance source 110 considers the action and provides guidance input 116 reflecting feedback on successfully performing the associated action to the agent coordination subsystem 106, which then routes the guidance input 116 from one or more requested guidance sources 110 to the requesting robot agent 102. The robot agent 102 then selects one or more guidance inputs 116 for incorporation into a solution for performing the subject action, and then performs the action according to the guided solution. The guidance input provided, or the results of performance of the action according to the guided solution, or both, then are incorporated into the learned model so that the learned model evolves to facilitate the subsequent successful performance of similar actions by the robot agents 102.

Figure 2:
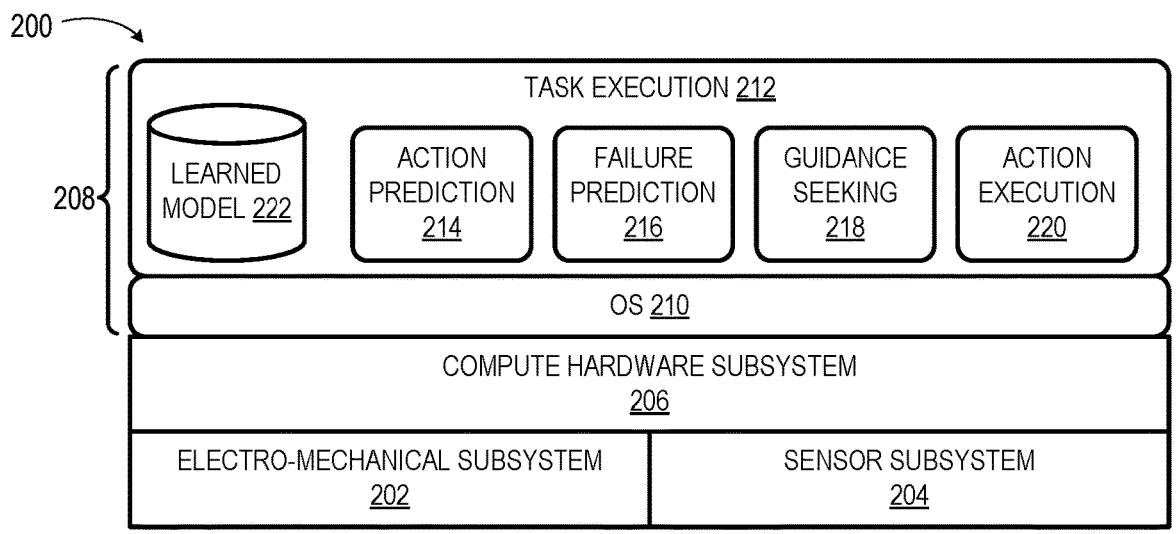
FIG. 2 is a block diagram illustrating an example hardware and software configuration of a robot agent in accordance with some embodiments.

FIG. 2 illustrates an example generalized hardware and software configuration 200 of a robot agent 102 in accordance with some embodiments. As illustrated, the hardware components of the robot agent 102 include an electro-mechanical subsystem 202, a sensor subsystem 204, and a compute hardware subsystem 206. The electro-mechanical subsystem 202 includes electro-mechanical components used to manipulate the robot agent 102 in physical space and the chassis and other structural components in support thereof, including motors, servos, actuators, and the like. The sensor subsystem 204 includes one or more sensors for detecting conditions and other parameters of the physical space in which the robot agent 102 is located, such as image sensors, light detection and ranging (lidar) sensors, or radar sensors for computer vision or visual telemetry, thermal sensors for environmental temperature sensing, acoustic sensors for detecting the presence of humans or other items of interest, Global Positioning System (GPS) sensors and other position-detecting sensors, and the like. The sensor subsystem 204 further may include one or more sensors for monitoring various parameters of subsystems of the robot agent 102 itself, such as battery charge status sensors, component calibration sensors, and the like.

The compute hardware subsystem 206 includes compute components to manage the inputs and outputs from the electro-mechanical subsystem 202 and sensor subsystem 204, as well as to execute one or more software programs of a software stack 208 implemented at the robot agent 102. Such components can include processors (e.g., central processing units and graphics processing units), random access memory, non-volatile storage devices, input/output (I/O) interfaces, wireless or wired network interfaces, monitors, keyboards, mice, touchscreens, joysticks, steering wheels, and other user I/O devices, and the like.

The software stack 208 includes one or more software programs, that is, sets of executable instructions that, when executed by one or more processors of the compute hardware subsystem 206, manipulate components of the compute hardware subsystem 206, the electro-mechanical subsystem 202, and the sensor subsystem 204 to perform various operations in furtherance of the techniques and processes described herein. To this end, the software programs may utilize libraries, application programming interfaces (APIs), and other similar ancillary software tools in performing these operations. In the illustrated embodiment, the software stack 208 includes an operating system (OS) 210 and task execution software 212. As is well known in the art, the OS 210 operates as the interface between the task execution software 212 and the hardware components of the robot agent 102, as well as handling various lower-level processes. The task execution software 212 includes one or more software programs to perform operations in support of execution of the one or more tasks assigned to the robot agent 102 by the agent coordination subsystem 106 (FIG. 1). For purposes of reference, these operations are logically organized as an action prediction module 214, an action failure prediction module 216, a guidance seeking module 218, and an action execution module 220. Each of these modules may be implemented as one or more separate software programs, or one or more of these modules may be implemented in the same software program or set of software programs. Moreover, while referenced as separate modules based on their overall functionality, it will be appreciated that the functionality ascribed to any given model may be distributed over more than one software program. For example, one software program may handle a subset of the functionality of the action prediction module 214 while another software program handles another subset of the functionality of the action prediction module 214 and the functionality of the failure prediction module 216.

The action prediction module 214 generally represents the executable instructions that manipulate the configuration 200 to forecast or otherwise predict the sequence of actions that are to be performed by the robot agent 102 in furtherance of a task assigned to the robot agent. The action failure prediction module 216 generally represents the executable instructions that manipulate the configuration 200 to predict whether the robot agent 102 is likely to fail to adequately perform an upcoming action. The guidance seeking module 218 generally represents the executable instructions that manipulate the configuration 200 to seek guidance input from one or more of the guidance sources 110 (FIG. 1) in performing the action when the robot agent 102 is predicted to otherwise fail in performing the action. The action execution module 220 generally represents the executable instructions that manipulate the configuration 200 to perform each action in the sequence of actions generated by the action prediction module 214 and vetted by the modules 216 and 218. In at least one embodiment, some or all of the modules 214-220 utilize a learned model 222 maintained by the robot agent 102, either individually or in collaboration with one or both of the agent coordination subsystem 106 and one or more other robot agents 102. Although illustrated as a component of task execution software 212, in at least one embodiment the learned model 222 is implemented as a set of one or more data structures stored in one or more memories, non-volatile storage devices, or combination thereof, of the compute hardware subsystem 206. The operations of the configuration 200, and the modules 214-220 and the learned model 222, are described in greater detail below.

Figure 3:
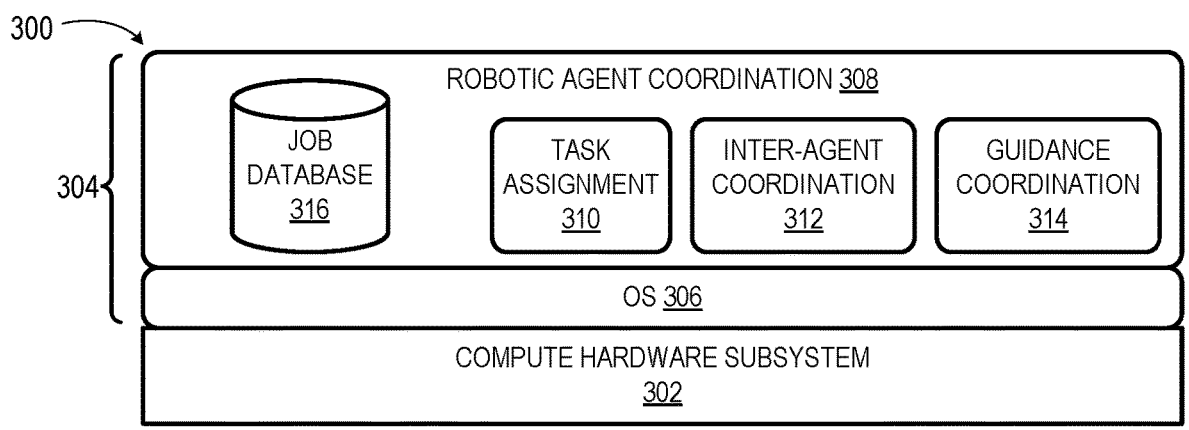
FIG. 3 is a block diagram illustrating an example hardware and software configuration of an agent coordination subsystem in accordance with some embodiments.

FIG. 3 illustrates an example generalized hardware and software configuration 300 of the agent coordination subsystem 106 in accordance with some embodiments. The configuration 300 includes a compute hardware subsystem 302 and a software stack 304. As with the compute hardware subsystem 206 of the configuration 200, the compute hardware subsystem 302 includes one or more processors, random access memory, non-volatile storage devices, I/O interfaces, wireless or wired network interfaces, and user I/O devices to support the functionality described herein. The software stack 304 includes one or more software that, when executed by one or more processors of the compute hardware subsystem 302, manipulate components of the compute hardware subsystem 302 to perform various operations in furtherance of the techniques and processes described herein. These one or more software programs include an OS 306 and agent coordination software 308. The OS 306 operates as the interface between the agent coordination software 308 and the hardware components, as well as handling various lower-level processes.

The agent coordination software 308 includes one or more software programs to perform operations in support of assignment of tasks to the robot agents 102 (FIG. 1) and the coordination of communications between robot agents 102 and between the robot agents and the guidance sources 110 (FIG. 1). For purposes of reference, these operations are logically organized as a task assignment module 310, an inter-agent coordination module 312, and a guidance coordination module 314. As with modules 214-220 of configuration 200 of FIG. 2, each of modules 310-314 may be implemented as one or more separate software programs, or one or more of these modules may be implemented in the same software program or set of software programs. The task assignment module 310 has access to one or more job databases 316 (implemented in memory or storage of the compute hardware subsystem 302) that store or otherwise represent jobs to be performed by the robot agents 102, and the assignment module 310 operates to assign tasks from the job database 316 to corresponding robot agents 102 based on any of a variety of criteria, including bandwidth or capacity, suitability of a given robot agent for the task, and the like. The inter-agent coordination module 312 operates to facilitate communication and other forms of coordination between the robot agents 102, such as communication of current locations, statuses, operating capacities, and the like, as well as distribution of knowledge and other information from the learned model 222 of one robot agent 102 for integration at the learned model 222 of another robot agent 102, and the like.

Figure 4:
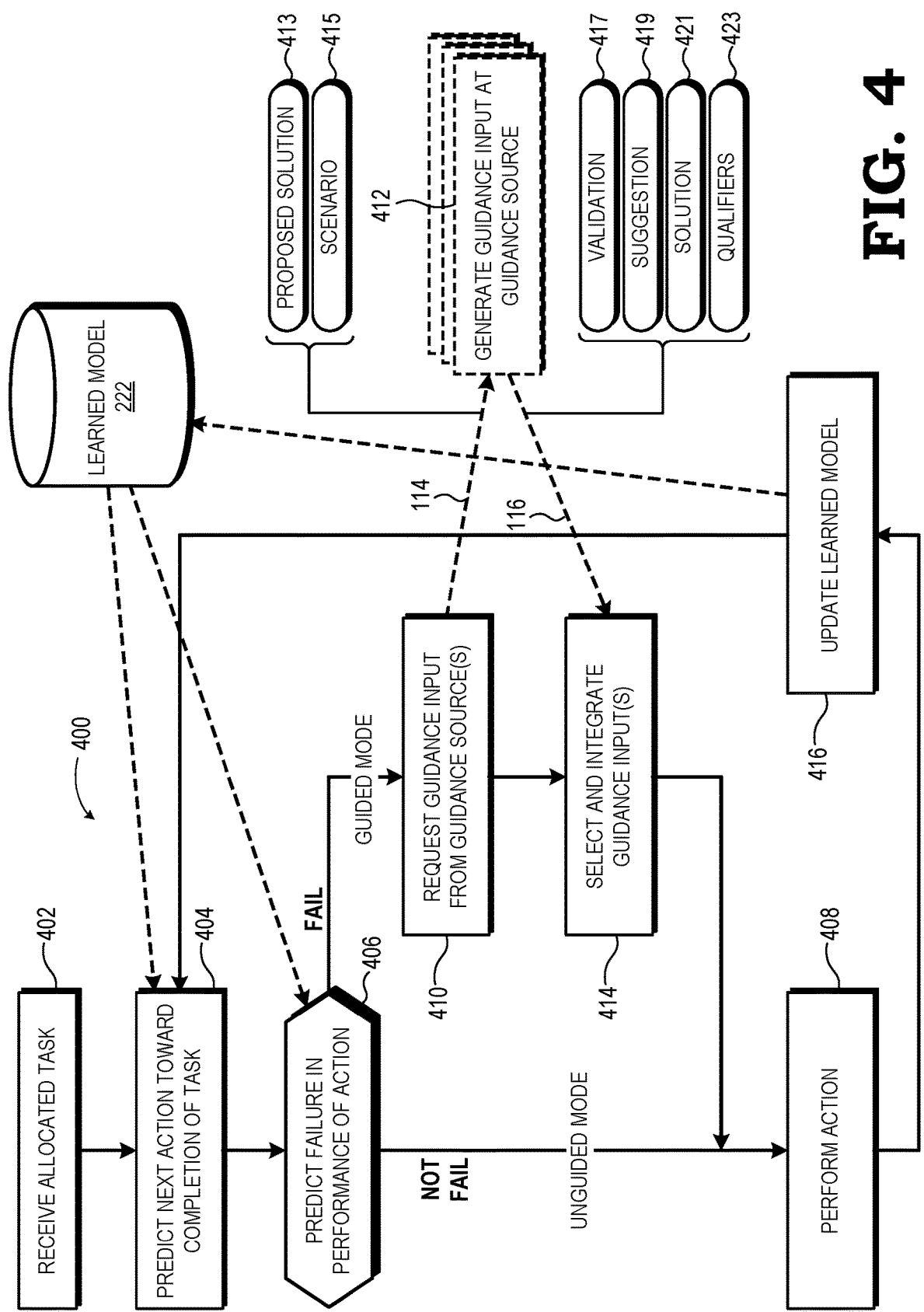
FIG. 4 is a flow diagram illustrating an example proactive continual learning process employed by a robot agent during performance of a task in accordance with some embodiments.

FIG. 4 illustrates an example method 400 of operation of the system 100 for autonomous performance of tasks by a robot agent 102 based on a proactive continual learning technique in accordance with some embodiments. For ease of illustration, the method 400 is described below in the example context of the configuration 200 for the robot agents 102 of FIG. 2 and the configuration 300 for the agent coordination subsystem 106 of FIG. 3. However, the method 400 is not limited to this example context, but instead may be employed for any of a variety of possible configurations of the robot agent 102 and the agent coordination subsystem 106 using the guidelines provided herein.

Method 400 initiates for an iteration of task performance at block 402 with the receipt by the task execution software 212 of the robot agent 102 of a task assigned to the robot agent by the task assignment module 310 of the agent coordination subsystem 106. The task may be so assigned by transmitting one or more data structures to the robot agent 102 via a wireless or wired link (task communication 112, FIG. 1), where the one or more data structures include information representative of the salient details of the task to be performed. For example, in the context of a warehouse/forklift implementation, an assigned task could be a pick-and-place task to move a specified pallet to a specified location, and the task represented by a data structure storing information representing an identifier associated with the pallet, an indicator of a last known location of the pallet (e.g., a GPS coordinate or a rack location designator), an indicator of the intended destination location for the pallet, an indicator of the recorded weight of the loaded pallet, an indicator of the type of materials loaded on the pallet, and the like.

In at least one embodiment, the robot agent 102 employs a sequential model of actions to perform the assigned task; that is, the assigned task is transformed by the robot agent 102 into a sequence of predicted actions, each predicted action to be performed in turn after performance of the previous action is complete. Accordingly, at block 404 the action prediction module 214 of the configuration 200 for the robot agent 102 predicts the next action to be performed by the robot agent 102 in furtherance of the task (or, if the robot agent 102 is starting this process from a newly-received task, predicting the first action to be performed). In at least one embodiment, the robot agent 102 employs the learned model 222 to forecast the next action to be taken using the task itself and one or more other signals.

The learned model 222, in one embodiment, represents a system represented by one or more data structures, executable instructions, or combinations thereof, that is trained and having an internal representation modified or adapted based in input or experience during the training process. One example of the learned model 222 is a neural network. Other implementations include parametric representations, such as coefficients for dynamics models, latent or explicit embedding into metric spaces for methods like nearest neighbors, or the like. The learned model 222 may be initiated at a particular robot agent 102 by, for example, populating the learned model 222 with the knowledge of a learned model of another robot agent 102 or a "default knowledge core" maintained by the agent coordination subsystem 106 for distribution to each robot agent 102 as it comes online for the first time. In other embodiments, the learned model 222 may be initialized through a supervised learning process (e.g., a "learning by demonstration" process) so as to obtain a baseline set of knowledge regarding the operational environment 104 and the performance of at least certain tasks by the robot agent 102.

To illustrate the action prediction process of block 404 using the forklift pick-and-place example introduced above, the task of moving a pallet to a specified destination includes a sequence of actions including: traveling along a suitable path between the current location of the forklift and the location of the pallet; identifying a position of the pallet in the pallet rack holding the pallet; loading the pallet onto the pallet forks of the forklift from its location in the pallet rack; traveling along a suitable path from the pallet rack to the specified destination location; placing the pallet in a suitable position at the destination location and disengaging the pallet forks from the pallet; and after placing the pallet, traveling along a suitable path to a holding location that does not interfere with other operations being conducted at the warehouse. Some of all of these macro-level actions may be segmented into more detailed actions. For example, the action of travelling along a suitable path between the current location of the forklift and the original location of the pallet may involve a sequence of actions that include engaging servos and other actuators of the electro-mechanical subsystem 202 to position the pallet forks at an appropriate height and angle to avoid contact with other objects in the warehouse while traveling along the identified path, then performing a series of driving actions that conduct the chassis of the forklift along the identified path, with each driving action including, for example, engaging motors to rotate the wheels of the chassis so as to drive the forklift forward or backward, servos to operate the steering assembly to turn the forklift, accessing imaging input, GPS input, or other sensor input from the sensor subsystem 204 to determine actual present location versus expected present location and then actuating the motors and servos of the drive and steering assemblies to compensate accordingly, etc.

In some embodiments, the action prediction module 214 predicts the entire sequence of discrete actions expected to be taken by the robot agent using the learned model 222, and then each predicted action is analyzed, refined, and performed in turn using the techniques described herein. However, this approach typically is not effective for any but the shortest of action sequences as errors in the prediction and performance processes may compound over time. Accordingly, in other embodiments, the action prediction module 214 predicts one or a small subset of actions to be performed in the near future (e.g., in the next few seconds for the forklift example), evaluates and refines the predicted action as necessary, performs the predicted action, and incorporates knowledge gained from performing the action into the learned model 222, and then using the evolved learned model 222 to predict the next action or small number of actions to be taken, and repeating the process again. This latter approach serves as the basis for remaining processes of method 400, but the principles described herein may be modified for use with the former approach.

With a predicted action identified, at block 406 the action failure prediction module 216 uses the learned model 222 to analyze the predicted action and various signals from the robot agent 102, from other robot agents 102, from the agent coordination subsystem 106 or from other elements of the system 100, for from some combination thereof, to predict whether the robot agent 102 is likely to fail to adequately perform the action. In this context, "failure" can be specified in various ways, depending on the goals and parameters of the system 100. For example, in instances whereby the robot agents 102 are large, powerful, or otherwise capable of causing serious bodily harm, "failure" in performing an action may include, for example, placing a human at substantial risk for injury. Similarly, "failure" may be identified as placing objects in the operating environment 104 at substantial risk for damage, or exposing the robot agent 102 itself to substantial risk of damage. In other contexts, "failure" could be considered performing an action, or performing the overall task, over a duration that exceeds a maximum threshold, or performing the action or overall task in a manner that introduces uncertainty in the result (e.g., successfully picking and transporting a pallet, but placing it in a destination location that is outside of a threshold margin of the intended destination location).

The signals considered in making this prediction can include, for example, indicia of the quality of the action (that is, some quantitative or qualitative measure of one or both of the utility of the action and the risk of the action), familiarity of the circumstances surrounding the action to other actions and circumstances encountered previously, unfamiliar or anomalous circumstances, status or capability indicia for the components of the robot agent 102 itself, status or capability indicia for other robot agents 102 or other elements in the operating environment 104, and the like. The ultimate decision on whether performance of the predicted action is likely to fail may include a straightforward thresholding approach (e.g., by comparing each signal to a corresponding threshold, or by generating a final failure score and comparing this single score to a corresponding threshold) or by employing a more complex expert system, such as a neural network, to determine a failure predictor representative of a prediction of the likelihood that the robot agent 102 will fail to adequately perform the predicted action. The failure prediction process of block 406 is described in greater detail below with reference to FIG. 5.

In the event that the robot agent 102 is predicted to not fail (that is, succeed) in adequately performing the predicted action, then the robot agent 102 implements an unguided mode for performing the action. In the unguided mode, the robot agent 102 directly performs the action without seeking guidance from one or more teachers or experts in the form of guidance sources 110. Accordingly, in the unguided mode, at block 408 the action execution module 220 of the configuration 200 of the robot agent 102 interfaces with the OS 210 and the compute hardware subsystem 206 to manipulate components of the electro-mechanical subsystem 202 (and potentially with input from sensors of the sensor subsystem 204) to control the various electro-mechanical components of the robot agent 102 to perform the action. For example, if the action is to lift the pallet forks of a forklift to a specified height in the process of a pallet pick task, at block 408 the action execution module 220 manipulates the OS 210 and compute hardware subsystem 206 so as to generate the electrical signaling needed to drive the servos and other motors of the fork elevator assembly so as to raise the forks to the specified height.

Returning to block 406, in the event that the robot agent 102 is predicted to fail to adequately perform the predicted action, then the robot agent 102 implements a guided mode for performing the action. In the guided mode, the robot agent 102 seeks and implements guidance from one or more of the guidance sources 110 to identify a guided solution for performing the action in a manner that reduces the risk of failure, and then performs the action on the basis of the guided solution. The guidance sources 110 providing such guidance may include human operators interfacing with a terminal or other computing system, an expert system either having a more evolved learned model or compute resources that will allow it to generate a solution substantially faster than the compute resources of the requesting robot agent 102 will permit, or another robot agent 102 that may have its own learned model 222 that has encountered the same scenario or a similar scenario and thus may have the knowledge to provide a sufficient solution for performing the action without failure.

Accordingly, in response to entering the guided mode for an action, at block 410 the guidance seeking module 218 sends a request for guidance (guidance request 114) to one or more of the guidance sources 110, either directly or via the guidance coordination module 314 of the agent coordination subsystem 106. To illustrate, in one embodiment, the guidance coordination module 314 monitors the statuses of the guidance sources 110, as well as maintains information regarding the suitability of each guidance source 110 for providing guidance. For example, guidance source 110-1 may have a better model or other knowledge of how to best pick a pallet, whereas guidance source 110-3 may be an expert in path routing through a warehouse. Thus, the guidance coordination module 314 may assign pick-related actions to the guidance source 110-1 and assign route-related actions to the guidance source 110-3. The guidance coordination module 314 may also choose which guidance sources 110 are to receive the guidance request based on bandwidth availability or other resource allocation factors. Still further, in some embodiments, the guidance request is distributed to all of the available guidance sources 110 in the set 108, and each guidance source 110 itself may choose whether to respond within a specified time limit. At block 412, each guidance source 110 receiving the guidance input and intending to supply guidance evaluates the representation of the action and the salient factors in performing the action and provides a corresponding guidance input either directly to the robot agent 102 or to the guidance coordination module 313 of the agent coordination subsystem 106 for further processing and distribution to the robot agent 102.

The format of the guidance request may be implemented in a number of ways. In some embodiments, the task execution software 212 of the robot agent 102 generates a proposed solution for performing the action in question, and the guidance request includes a description or other representation 413 of this proposed solution. In this case, a guidance source 110 evaluating the guidance request then rates the validity of the proposed solution, and this rating is represented in the guidance input supplied by the guidance source as validation feedback 417. To illustrate, for a pick action the representation 413 of the proposed solution may include one or more images of a pallet and an indication of a pick point for the pallet within the one or more images. A receiving guidance source 110 then may separately evaluate the one or more images, and then provide guidance input in the form of validation feedback 417 that either confirms or rejects the proposed pick point.

In other embodiments, the guidance request includes one or more data structures with a representation 415 of the scenario surrounding the action; that is, the various signals that sufficiently describes the salient parameters of the action to be performed, the desired outcome, and the various conditions and statuses of the operating environment 104 and the systems of the robot agent 102 that may influence the performance of the action. From this, the guidance source 110 may provide guidance input in the form of a representation 419 of a suggestion that serves to focus the robot agent 102 in its performance of the action. To illustrate, the guidance input can include a waypoint or direction to explore when navigating to locate a pallet or an approximate physical region to evaluate for lift points for a forklift when picking up a pallet. The guidance input instead may be a representation 421 of a proposed solution to performing the action. In this case, the guidance input is formatted to provide a description that the action execution module 220 of the robot agent can interpret and transform using the learned model 222 into a set of one or more sub-actions or a policy for performing the action.

At block 414, the guidance seeking module 218 receives the data representing the guidance input from each participating guidance source 110, and from the one or more received guidance inputs, the guidance seeking module 218 selects one or more guidance inputs and integrates each selected guidance input into the learned model 222 in order to generate a guided solution for performing the action. Any of a number of factors may be considered by the guidance seeking module 218 in making this selection. To illustrate, in some embodiments, the guidance source 110 may provide an qualifier 423 on the quality of its guidance feedback, such as an indicator of a quantitative or qualitative evaluation of its expertise in the type of action being evaluated or an indicator of its confidence in the provided suggestion or complete solution represented in the guidance input being a correct solution to performing the task, and the guidance seeking module 218 may then apply one or more thresholds to filter out certain guidance inputs on the basis of expertise or confidence or other qualifier on the feedback represented in the guidance input. As another example, the guidance seeking module 218 may compare the guidance inputs and select those guidance inputs that are sufficiently similar. As yet another example, the guidance seeking module 218 may use each guidance input as a vote for the solution represented by the guidance input, and if sufficient votes are obtained for a particular solution, identified that solution as the guidance to be integrated. Still further, the selection process may be implemented at least in part using a learned system (e.g., the learned model 222 or another learned model) that incorporates the various knowledge represented in the guidance inputs and which evolves over time, such as by examining prior guidance so as to select or learn which guidance to follow in the present. To illustrate, the guidance input may be implemented using any of a variety of Ensemble learning-based techniques, using a second-order model that learns to select which expert to follow in the present based on previous instances, a weighting model that learns to selectively mix in or reject multiple guidance signals based on different qualifiers (such as confidence task type or sensor features), and the like.

The description above illustrates an embodiment of a guided performance mode in which the task execution software 212 of the robot agent 102 seeks guidance, obtains guidance input, and integrates the guidance input so as to determine a guided solution to the action that the robot agent 102 expects to perform without failure. However, in other embodiments, one or more of these sub-processes may be performed by the guidance coordination module 314 of the agent coordination subsystem 106 shared by multiple robot agents 102. To illustrate, in some implementations the agent coordination subsystem 106 may have considerably more processing and data storage resources than those of the robot agent 102, and thus the agent coordination subsystem 106 may manage the requests for guidance, the receipt and analysis of guidance input from the guidance sources 110, and the determination of a guided solution for performing the action from such received guidance input, which is then communicated to the task execution software 212 of the robot agent 102.

In either approach, with a guided solution so identified in the guided mode, at block 408 the action execution module 220 of the robot agent 102 interfaces with the OS 210 and the compute hardware subsystem 206 to manipulate components of the electro-mechanical subsystem 202 (and potentially with input from sensors of the sensor subsystem 204) to control the various electro-mechanical components of the robot agent 102 to perform the action in accordance with the determined guided solution to that action, as similarly described above with respect to the performance of an unguided action in the unguided mode.

As the system 100 employs a continual, or lifelong, learning process, in either mode, at block 416 the task execution software 212 operates to incorporate the knowledge gained from the process of predicting the action and then performing the action with either an unguided or guided solution into the learned model 222. The learning system for the agent takes input that may include, for example, user intervention decisions, the state of the system 100 (which may include current models, system information, etc.) and updates the learned model 222 based on the results. There are at least two approaches to incorporating learnings: (1) condense guidance into knowledge. In this case the learned model 222 has access to one or more databases to store all the guidance examples, and (2) internalize into the learning model. In this case the guidance is incorporated directly into the learned model 222. For example, a neural network (one example of the learned model 222) can be on the new guidance labels. In both the above cases, the learning system will retain the ability to review past guidance and retrain itself to further improve. For the first case, this may just be retraining over all the data. For the second case, this may include saving prior models and using them as experts to distill their knowledge into a new model.

With a predicted action in furtherance of the assigned task identified, evaluation for its potential to be adequately performed by the robot agent without guidance, a solution to the action performed either in an unguided mode or guided mode accordingly, and then one or both of the guidance obtained or the results of the performance of the solution to the action used to train the learned model 222 further, the process of method 400 returns to block 404 for a next action to be predicted and process as described above. In this manner, the system 100 employs a continual learning technique that proactively predicts actions likely to fail when performed by the robot agent 102, and seeks guidance for such actions from one or more experts so as to mitigate the potential to actually fail when the action ultimately is performed, and thus reducing the frequency at which the robot agent 102 fails in performance of its assigned task while leveraging the autonomous performance of actions by the robot in situations where the predicted action is not expected to fail without guidance.

Figure 5:
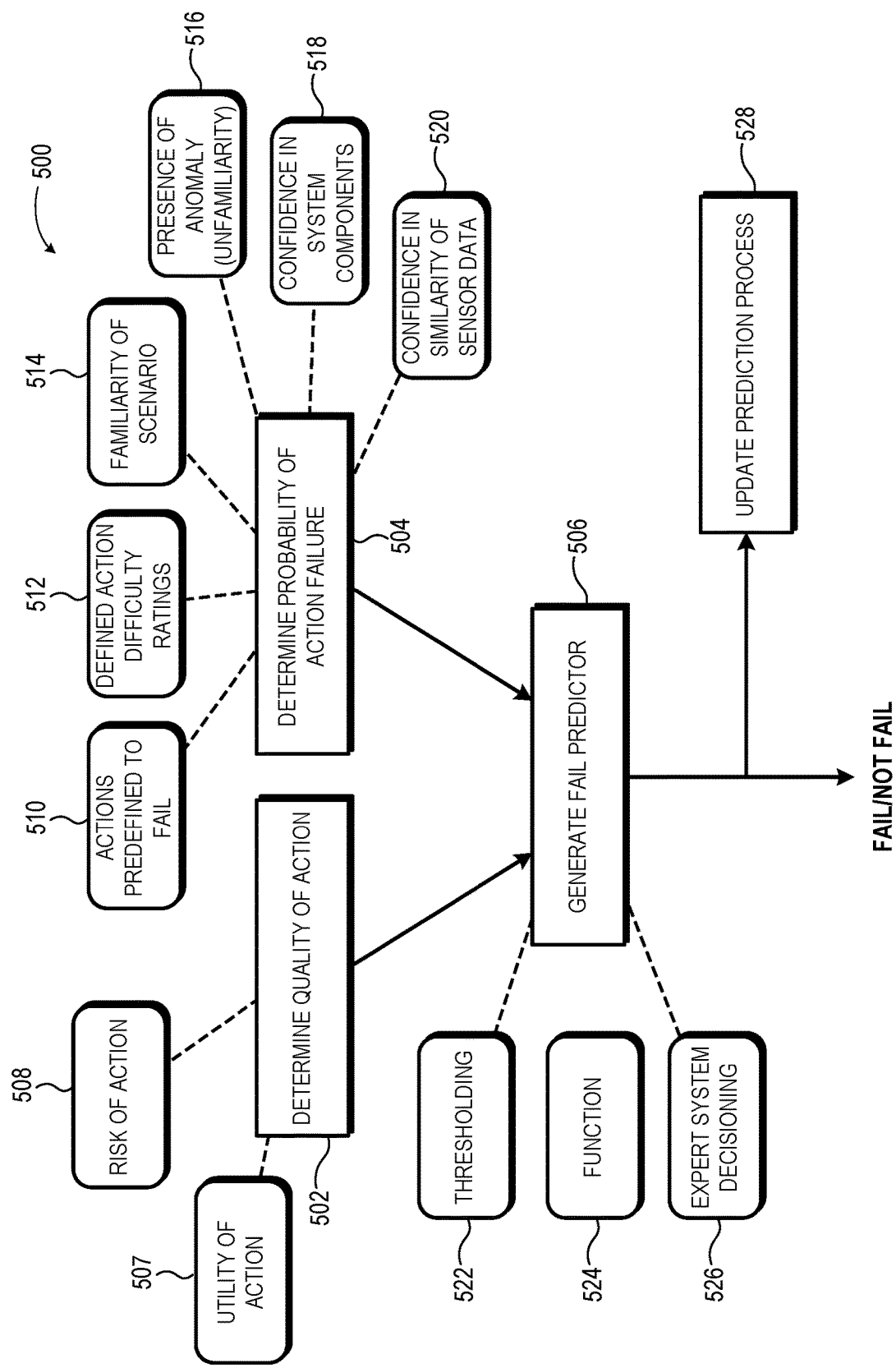
FIG. 5 is a flow diagram illustrating an example action failure prediction process in accordance with some embodiments.

FIG. 5 illustrates an example method 500 for predicting whether a robot agent 102 will fail to adequately perform an action in furtherance of an assigned task without guidance from one or more guidance sources 110 in accordance with some embodiments. The method 500, in at least one embodiment, represents the process of block 406 of method 400 of FIG. 4. As explained above, the decision by a robot agent 102 of whether to proceed with performing an action in an unguided mode or a guided mode is predicated on whether the robot agent 102 is predicted to fail in performing the action without guidance. Given the typical utilization of the robot agent 102 to perform tasks either as a replacement for a human agent or in conjunction with human agents performing tasks in the same operating environment 104, "failure" in this context typically means performing the action in a manner that risks injury to humans or to property, taking overly long to perform the action, performing the action in a manner that excessively interferes with the performance of actions by other agents, inability to execute the task successfully (such as being unable to place a pallet because another pallet is present in the place location), inability to perform the task with sufficient precision or accuracy, in ability to perform the task with a result that has a sufficiently high key performance indicator (KPI) or other performance-related metric for the task, and so forth. As such, the evaluation of a predicted action is not only whether the robot agent 102 can successfully perform the sequence movements or motions to enact the action itself, but whether the action can be enacted in a way that certain policies are met, such as the policy of not harming a human, the policy of not damaging the physical plant or another robot agent, and the like. This evaluation, in one embodiment, involves at least two determinations by the failure prediction module 216 of the robot agent 102 (or other component of the system 100): a determination as to the quality of the action (block 502) and a determination as to the probability (or other likelihood representation) that the robot agent 102 will be able to perform the action without violating one or more specified policies (block 504). Both of these determinations may rely on various signals, including signals determined by the robot agent 102 itself, signals provided by an external actor (e.g., as parameters or other information supplied by the agent coordination system 106 as part of the task assignment process, and the like). The signals considered in determining the probability of failure to perform the action may take any of a variety of forms. To illustrate, some signals may be a binary value, or a value representative of a magnitude of the corresponding confidence or other signal parameter. In other instances, the signal may constitute a measure on distributions or probability functions.

With regard to the determination as to the quality of the predicted action at block 502, this quality may be represented in a quantitative or qualitative manner, and may include, for example, an indicator of the utility of the action and an indicator of a risk involved with performing the action. The utility of the action represents the value of performing the action toward a goal. To illustrate, the movement of a pallet from a trailer of a semi-tractor to a pallet rack in a warehouse will have a higher utility rating, whereas shifting a pallet from one pallet rack to an adjacent pallet rack for stock rotation purposes may have a lower utility rating. The risk of the action (block 508) represents the risk in violating one or more policies, and the magnitude of such violation, if the action were to be performed. To illustrate, an action that will involve movement of a pallet in an area in which human agents are known or expected to be present typically will have a higher risk than movement of a pallet in an area which has been confirmed to be devoid of human agents. As another example, movement of a pallet containing dangerous chemicals typically will be assigned a higher risk than movement of an empty pallet. The quality of the predicted action thus may represent the utility of the action and the risk of the action in any of a variety of manners. To illustrate, the utility of the action and the risk of the action each may be assigned a separate score, and these scores and then used in the failure prediction analysis. As another example, quality of the action may be represented as, for example, a ratio of utility to risk. Other representations may be implemented using the guidelines provided herein.

With regard to the determination of the probability of failure to perform the action within the constraints of one or more policies at block 504, the failure prediction module 216 may rely on any of a variety of signals, including the parameters of the action itself, and further may rely on information outside of the action. To illustrate, as a cautionary step, such as when life or valuable property is at risk, the system may pre-define certain actions as actions predicted to fail regardless of other considerations (block 510). For example, an action that involves moving a pallet containing certain materials through a zone expected to have a human agent present may be pre-defined as an action predicted to fail, and thus forcing the robot agent 102 to seek expert guidance before performing the action. Another signal may include a predefined "difficulty ranking" for certain actions or action types (block 512). To illustrate using a simplistic example, a difficulty scale may be devised to extend from 1 (very likely to succeed) to 10 (very likely to fail) and each of a set of action types may be assigned a difficulty ranking between 1 and 10. An action type of, for example, moving the forks of a forklift in the vertical plane only while the forklift is stationary may be assigned, for example, a ranking of 1, whereas placing the forks into a pallet located at the top shelf of a pallet rack and with a very acute observation angle by the pallet's computer vision sensors may be assigned, for example, a difficulty ranking of 10.

Two other signals considered may include, for example, a familiarity of the scenario of the action (block 514) and, relatedly but not necessarily inversely, an unfamiliarity of the scenario (block 516)—particularly in the presence of one or more anomalies. The familiarity signal may represent, for example, how close the data of the current scenario is to the data distribution. That is, the degree of familiarity of the current scenario to previous action scenarios accounted by the robot agent 102 (or another robot agent) and incorporated into the learned model 222. The unfamiliarity signal conversely may represent how different the data of the current scenario is to the data distribution; that is, the difference between the current action scenarios and previously-encountered action scenarios represented in the learned model 222. In particular, this signal may reflect the presence and magnitude of anomalies in the data of the current scenario, or may reflect the presence or magnitude of a number of disagreements in an ensemble of different models.

Another set of signals that may be considered include, for example, a confidence in the system components (block 518) and a confidence in the similarity of sensor data to previously-observed sensor data (block 520). The confidence in the system components reflects one or more of a precision or a reliability in the electro-mechanical components of the electro-mechanical subsystem 202 of the robot agent 102 to perform the motions involved in the proffered solution for the predicted action. To illustrate, a servo with a high rated precision and which has been confirmed to be operating within tight parameters would be associated with a higher confidence value, whereas a belt drive which has demonstrated significant and repeated slippage in the recent operational period would be associated with a lower confidence value. The confidence in the similarity of sensor data reflects the similarity of the sensor input for the scenario involving the predicted action to previously-observed sensor input, whether by the robot agent 102 about to attempt the task or by another robot agent 102. For example, when images captured by the computer vision sensors or perception stack of the robot agent 102 have a brightness and contrast similar to images captured by the computer vision sensors when previously performing a similar task, the confidence in the similarity of the sensor data may be set to a higher confidence value, whereas a significant deviance between one or both of brightness and contrast between current images and previously-captured images would result in a lower confidence value.

Some or all of these signals, as well as other various signals that may be utilized based on the teachings provided herein, are considered by the failure prediction module 216 to predict whether the robot agent will fail to perform the predicted action at issue (block 506). In at least one embodiment, this prediction is presented as a fail predictor, which may be formatted as a binary predictor (e.g., 0=predicted to succeed, 1=predicted to fail), or as a value within a range of more than two values (e.g., a range of 1 to 10), or using some other format as appropriate. Any of a variety of techniques may be employed to determine the fail predictor from the signals under consideration. To illustrate, in some embodiments, a thresholding approach (block 522) may be employed. In such implementations, a separate threshold may be compared to each signal or set of signals, and then a failure is predicted from the comparisons (e.g., exceeding a single threshold is grounds for predicting a failure, or tally of exceeded threshold and not-exceeded thresholds is determined). In other embodiments, a function or similar algorithm is employed (block 524). To illustrate, a function may be developed that computes a value for the fail predictor by summing values representing each of the signals weighted by some pre-defined constants or by other signals. As a simpler illustration, the defined difficulty rating of the action may be determined at block 504 and multiplied by a ratio of the utility-to-risk scores determined at block 502. For example, if the action has a difficulty ratio of, say, 5 and the utility-to-risk score is 1.4, then a multiplication of these two values results in a value of 7. This resulting score is then, for example, compared to a threshold to determine whether to set the fail predictor to a value of 0 or 1. In other embodiments, a more complex approach may be employed to generate a fail predictor from the various input signals. To illustrate, the learned model 222 may incorporate an expert system (block 526), such as a neural network, to determine the fail predictor from some or all of the signals available for evaluation, from human expert feedback, or combinations thereof. The learned model 222 also may take input from an exploratory agent, such as a reinforcement learning algorithm, in which it learns based on feedback on reward signal, which may be a quantitative measure of success or failure, received during training.

With the fail predictor determined, the robot agent 102 proceeds to initiate performance of the action in either an unguided mode or a guided mode, as described above, using the fail predictor to select between the two modes. Further, to improve fail prediction for future scenarios, in at least one embodiment the succeed/fail prediction represented by the fail predictor is fed back into the learned model 222 as training input at block 528, fed back into expert or exploratory agents, such as the reinforcement learning algorithm described above, or a combination thereof.

In one aspect, a computer-implemented method includes predicting a first action to be implemented by a robot agent in performing a task assigned to the robot agent, predicting whether the robot agent will fail in performing the first action. Responsive to predicting the robot agent will fail in performing the first action, the method includes obtaining guidance input for the first action from at least one guidance source, the guidance input representing guidance for performing the first action by the robot agent, and performing the first action by the robot agent using the guidance input. The method also can include predicting a second action to be implemented by the robot agent in performing the task, predicting whether the robot agent will fail in performing the second action, and responsive to predicting the robot agent will not fail in performing the second action, performing the second action by the robot agent without obtaining guidance input for the second action from a guidance source. The method further can include updating a learned model implemented by the robot agent based the guidance input. In some aspects, predicting whether the robot agent will fail in performing the first action includes predicting whether the robot agent will fail in performing the first action using the learned model. In some aspects, predicting whether the robot agent will fail in performing the first action includes predicting whether the robot agent will fail in performing the first action using a learned model. In some aspects, predicting whether the robot agent will fail in performing the first action is based on a set of signals, the set including at least one of: identification of a set of types of actions pre-identified to actions predicted to be failed in performance; defined action difficulty ratings for each action type of a set of action types; a representation of a familiarity of data representing a scenario in which the first action is to be performed; a representation of an unfamiliarity of data representing the scenario; a confidence in a performance capability of one or more components of the robot agent; and a confidence in a similarity of sensor data for the scenario with sensor data from one or more previously-performed actions. In such instances, predicting whether the robot agent will fail in performing the first action is further based on at least one of a representation of a utility of the first action and a representation of a risk of the first action, or predicting whether the robot agent will fail in performing the first action comprises applying a threshold to a value that is based on at least one of the signals of the set of signals. Further, predicting whether the robot agent will fail in performing the first action can include applying a function to at least a subset of the signals of the set of signals, or using an expert system with the set of signals. In some aspects, the at least one guidance source comprises at least one of: a human agent interfacing with a compute system; and an autonomous expert system.

The method further can include updating a learned model using the guidance input, the learned model used for at least one of predicting the first action and predicting whether the robot agent will fail in performing the first action. The method also may include receiving, at the robot agent, guidance input from each of a plurality of guidance sources, selectively incorporating guidance input from a subset of the guidance sources to determine a guided solution for performing the first action, and wherein performing the first action comprises performing the first action by the robot agent based on the guided solution.

In one aspect, obtaining guidance input comprises providing a proposed solution for performing the first action from the robot agent to a guidance source, and receiving, from the guidance source, verification of whether the proposed solution is an acceptable solution as guidance input. In another aspect, obtaining guidance input comprises providing information representing the first action from the robot agent to a guidance source and receiving, from the guidance source, a suggestion that serves to focus a determination of a solution for performing the first action by the robot agent as guidance input. Further, obtaining guidance input may include providing information representing the first action from the robot agent to a guidance source, and receiving, from the guidance source, a representation of a solution for performing the first action.

In another aspect, a system includes a robot agent comprising an electro-mechanical subsystem comprising one or more electro-mechanical components, a sensor subsystem comprising one or more sensors, and a compute hardware subsystem to execute one or more sets of executable instructions. The one or more sets of executable instructions are to manipulate the robot agent to predict a first action to be implemented by a robot agent in performing a task assigned to the robot agent, predict whether the robot agent will fail in performing the first action, and responsive to predicting the robot agent will fail in performing the first action: obtain guidance input for the first action from at least one guidance source, the guidance input representing guidance for performing the first action by the robot agent, and manipulate the electro-mechanical subsystem to perform the first action using the guidance input. The system further may include a plurality of robot agents including the robot agent, and an agent coordination subsystem in communication with the plurality of robot agents and the at least one guidance source, wherein the agent coordination subsystem is configured to facilitate communication of requests for guidance from the plurality of robot agents to the at least one guidance source and to facilitate communication of guidance input from the at least one guidance source to the plurality of robot agents. The agent coordination subsystem further is configured to assign tasks to the plurality of robot agents. In some aspects, the robot agent comprises an autonomous warehouse robot.

In still other aspects, a non-transitory computer readable medium embodies at least one set of executable instructions to manipulate at least one processor to predict a first action to be implemented by a robot agent in performing a task assigned to the robot agent, predict whether the robot agent will fail in performing the first action, and responsive to predicting the robot agent will fail in performing the first action: obtain guidance input for the first action from at least one guidance source, the guidance input representing guidance for performing the first action by the robot agent, and manipulate an electro-mechanical subsystem of the robot agent to perform the first action using the guidance input.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method of operating a robot agent including a movable physical component, the method comprising:
   predicting at least a first action to be implemented by the robot agent in performing a task assigned to the robot agent;
   predicting, at the robot agent, based on at least a set of pre-defined actions, which are actions predicted to fail regardless of other considerations, whether the robot agent will fail or succeed in performing the first action, said predicting including predicting failure when the first action is one of the pre-defined actions, which are actions predicted to fail regardless of other considerations;
   operating the robot agent to determine a mode of operation to be used to implement the first action based on whether the robot agent is predicted to fail or succeed in performing the first action, the robot agent determining to use an unguided mode of operation to perform the first action in response to predicting the robot agent will succeed in performing the first action and determining to use a guided mode of operation in response to predicting the robot agent will fail in performing the first action; and
   performing the first action by the robot agent using the determined mode of operation; and
   wherein predicting, at the robot agent, whether the robot agent will fail or succeed in performing the first action is performed prior to the robot agent attempting to perform said first action; and
   wherein moving a pallet through a zone in which a human is expected to be present is one of the pre-defined actions in the set of pre-defined actions, which are actions predicted to fail regardless of other considerations.

2. The method of operating the robot agent of claim 1, wherein the first action is moving a pallet through a zone in which a human is expected to be present;
   wherein predicting, at the robot agent, whether the robot agent will fail or succeed in performing the first action predicts that the robotic agent will fail in performing the first action due to the first action being an action in the set of pre-defined actions, which are actions predicted to fail regardless of other considerations; and
   wherein the method further comprises:
      obtaining guidance input for the first action from at least one guidance source, the guidance input representing guidance for performing the first action by the robot agent; and wherein performing the first action by the robot agent includes performing, in the guided mode of operation, the first action by the robot agent using the guidance input to control the robot agent.

3. The method of operating the robot agent of claim 1, wherein predicting, at the robot agent, based on at least a set of pre-defined actions, which are actions predicted to fail regardless of other considerations, whether the robot agent will fail or succeed in performing the first action is further based on a predefined difficulty ranking, said predefined difficulty ranking being in the form of a numeric value, corresponding to the first action to be performed.

4. The method of operating the robot agent of claim 1, wherein predicting, at the robot agent, whether the robot agent will fail or succeed in performing the first action includes determining that the first action will fail based on the first action being an action which is predetermined to be an action which will fail.

5. The method of operating the robot agent of claim 1, further comprising:
receiving, at the robot agent, guidance input from each of a plurality of guidance sources;
selectively incorporating guidance input from a subset of the guidance sources to determine a guided solution for performing the first action; and
wherein performing the first action comprises performing the first action by the robot agent based on the guided solution.

6. The method of operating the robot agent of claim 1, further comprising:
providing a proposed solution for performing the first action from the robot agent to a guidance source; and
receiving, from the guidance source, verification of whether the proposed solution is an acceptable solution.

7. The method of operating the robot agent of claim 1, further comprising:
providing information representing the first action from the robot agent to a guidance source; and
receiving, from the guidance source, a waypoint to use when navigating to locate a pallet.

8. The method of operating the robot agent of claim 1, further comprising:
providing information representing the first action from the robot agent to a guidance source; and
receiving, from the guidance source, a representation of a solution for performing the first action.

9. The method of operating the robot agent of claim 8, wherein the guidance source comprises at least one of: i) a human agent interfacing with a computer system and ii) an autonomous expert system.

10. A method of operating a robot agent including a movable physical component, said robot agent being a forklift, the method comprising:
predicting, at the robot agent, at least a first action to be implemented by the robot agent in performing a task assigned to the robot agent, said predicting being based on at least based on a predefined difficulty ranking, said predefined difficulty ranking being in the form of a numeric value, corresponding to the first action to be performed;
operating the robot agent to determine a mode of operation to be used to implement the first action based on whether the robot agent is predicted to fail or succeed in performing the first action, the robot agent determining to use an unguided mode of operation to perform the first action in response to predicting the robot agent will succeed in performing the first action and determining to use a guided mode of operation in response to predicting the robot agent will fail in performing the first action; and
performing the first action by the robot agent using the determined mode of operation; and
wherein the first action to be performed is one of: i) moving forks of the forklift in a vertical plane only while the forklift is stationary and ii) placing the forks of the forklift into a pallet located at a top shelf of a pallet rack; and
wherein a first predefined difficulty ranking corresponding to the action of moving forks of the forklift in a vertical plane only while the forklift is stationary indicates a lower difficulty level than a predefined difficulty ranking corresponding to the action of placing the forks of the forklift into a pallet located at the top shelf of a pallet rack.

11. The method of operating the robot agent of claim 10, wherein predicting whether the robot agent will fail in performing the first action is further based on a utility of the first action expressed in the form of a utility score and a risk associated with the first action expressed as a risk score.

12. The method of operating the robot agent of claim 11, wherein predicting whether the robot agent will fail in performing the first action includes:
multiplying the difficulty rating corresponding to the first action to be taken by a ratio of the utility score corresponding to the first action to be taken to the risk score corresponding to the first action to be taken to generate a resulting value; and
comparing the resulting value to a threshold to determine based on the comparison of the result to the threshold if the robot agent is predicted to fail in performing the first action.

13. The method of operating the robot agent of claim 10, wherein predicting whether the robot agent will fail in performing the first action comprises applying a function to values obtained from multiple signals, said multiple signals including a signal indicating a defined action difficulty rating and another signal indicating a confidence in a similarity of sensor data with sensor data from one or more previously-performed actions.

14. A robot agent comprising:
an electro-mechanical subsystem comprising one or more electro-mechanical components;
a sensor subsystem comprising one or more sensors; and
a computer hardware subsystem to execute one or more sets of executable instructions, the one or more sets of executable instructions, when executed, manipulate the robot agent to:
predict, based on at least a set of pre-defined actions which are actions, predicted to fail regardless of other considerations, whether the robot agent will fail or succeed in performing the first action, said predicting including predicting failure when the first action is one of the pre-defined actions, which are actions predicted to fail regardless of other considerations, said step of predicting whether the robot agent will fail or succeed in performing the first action being performed prior to the robot agent attempting to perform said first action; and wherein moving a pallet through a zone in which a human is expected to be present is one of the pre-defined actions in the set of pre-defined actions, which are actions predicted to fail regardless of other considerations;

operate the robot agent to determine a mode of operation to be used to implement the first action based on whether the robot agent is predicted to fail or succeed in performing the first action, the robot agent determining to use an unguided mode of operation to perform the first action in response to predicting the robot agent will succeed in performing the first action and determining to use a guided mode of operation in response to predicting the robot agent will fail in performing the first action; and manipulate the electro-mechanical subsystem to perform the first action using the determined mode of operation.

15. The robot agent of claim 14,
wherein predicting whether the robot agent will fail or succeed in performing the first action predicts that the robotic agent will fail in performing the first action due to the first action being an action in the set of pre-defined actions, which are actions predicted to fail regardless of other considerations; and
wherein the computer hardware sub-system is configured to control the robot agent to:
obtain guidance input for the first action from at least one guidance source, the guidance input representing guidance for performing the first action by the robot agent; and
perform the first action in the guided mode of operation, the first action by the robot agent using the guidance input to control the robot agent.

16. The robotic agent of claim 14, wherein predicting, based on at least a set of pre-defined actions, which are actions predicted to fail regardless of other considerations, whether the robot agent will fail or succeed in performing the first action is further based on a predefined difficulty ranking, said predefined difficulty ranking being in the form of a numeric value, corresponding to the first action to be performed.

17. The robotic agent of claim 14,
wherein the robot agent is a forklift;
wherein the first action to be performed is one of: i) moving forks of the forklift in a vertical plane only while the forklift is stationary and ii) placing the forks of the forklift into a pallet located at a top shelf of a pallet rack; and
wherein a first predefined difficulty ranking corresponding to the action of moving forks of the forklift in a vertical plane only while the forklift is stationary indicates a lower difficulty level than a predefined difficulty ranking corresponding to the action of placing the forks of the forklift into a pallet located at the top shelf of a pallet rack.

18. The robotic agent of claim 17, wherein predicting whether the robot agent will fail or succeed in performing the first action is further based on a utility of the first action expressed in the form of a utility score and a risk associated with the first action expressed as a risk score.

19. The robotic agent of claim 18, wherein predicting whether the robot agent will fail or succeed in performing the first action includes:
multiplying the difficulty rating corresponding to the first action to be taken by a ratio of the utility score corresponding to the first action to be taken to the risk score corresponding to the first action to be taken to generate a resulting value; and
comparing the resulting value to a threshold to determine, based on the comparison of the result to the threshold, if the robot agent is predicted to fail in performing the first action.

20. A non-transitory computer readable medium embodying at least one set of executable instructions to manipulate at least one processor of a robot agent including a movable physical component to:
predict at least a first action to be implemented by the robot agent in performing a task assigned to the robot agent;
predict, at the robot agent, based on at least a set of pre-defined actions, which are actions predicted to fail regardless of other considerations, whether the robot agent will fail or succeed in performing a first action, said predicting including predicting failure when the first action is one of the pre-defined actions, which are actions predicted to fail regardless of other considerations, said step of predicting whether the robot agent will fail or succeed in performing the first action being performed prior to the robot agent attempting to perform said first action; and wherein moving a pallet through a zone in which a human is expected to be present is one of the pre-defined actions in the set of pre-defined actions, which are actions predicted to fail regardless of other considerations;
control the robot agent to determine a mode of operation to be used to implement the first action based on whether the robot agent is predicted to fail or succeed in performing the first action, the robot agent determining to use an unguided mode of operation to perform the first action in response to predicting the robot agent will succeed in performing the first action and determining to use a guided mode of operation in response to predicting the robot agent will fail in performing the first action; and
control the robotic agent to perform the first action using the determined mode of operation.

* * * * *